United States Patent
Zhan

(10) Patent No.: US 9,797,027 B2
(45) Date of Patent: Oct. 24, 2017

(54) METHOD FOR RECYCLING INDIUM

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventor: Yifei Zhan, Beijing (CN)

(73) Assignees: BOE TECHNOLOGY GROUP CO., LTD., Beijing (CN); HEIFEI XINSHENG OPTOELECTRONICS TECHNOLOGY., LTD., Hefei, Anhui (CN)

( * ) Notice: Subject to any disclaimer, the term of this patent is extended or adjusted under 35 U.S.C. 154(b) by 202 days.

(21) Appl. No.: 14/795,148

(22) Filed: Jul. 9, 2015

(65) Prior Publication Data

US 2016/0273073 A1  Sep. 22, 2016

(30) Foreign Application Priority Data

Mar. 18, 2015 (CN) .......................... 2015 1 0119878

(51) Int. Cl.
*C22B 1/00* (2006.01)
*C22B 7/00* (2006.01)
(Continued)

(52) U.S. Cl.
CPC .............. *C22B 58/00* (2013.01); *C01G 15/00* (2013.01); *C22B 1/005* (2013.01); *C22B 7/006* (2013.01); *Y02P 10/234* (2015.11)

(58) Field of Classification Search
CPC ......... C22B 1/005; C22B 58/00; C22B 7/007; C01G 15/00
See application file for complete search history.

(56) References Cited

FOREIGN PATENT DOCUMENTS

CN  104630486 A  *  5/2015
JP  2000169991 A  *  6/2000
(Continued)

OTHER PUBLICATIONS

Kano, Junya, Eiko Kobayashi, William Tongamp, Shoko Miyagi, and Fumio Saito. "Non-thermal Reduction of Indium Oxide and Indium Tin Oxide by Mechanochemical Method." Journal of Alloys and Compounds 484 (2009): 422-25. Science Direct. Elsevier, May 3, 2009.*

(Continued)

*Primary Examiner* — George Wyszomierski
*Assistant Examiner* — Tima M McGuthry Banks
(74) *Attorney, Agent, or Firm* — NATH, GOLDBERG & MEYER; Joshua B. Goldberg

(57) ABSTRACT

Provided is a method for recycling indium from a panel on which an electrode layer made of indium tin oxide (ITO) is formed, comprising:
S1 —removing each of pattern layers on the panel to obtain particles formed by the pattern layers;
S2 —adding an acid solution to the particles so as to dissolve the substances which can be dissolved in the acid solution, and then filtering to give a solution containing indium ion;
S3 —adding an alkaline solution to the solution obtained in step S2, so that metal ions other than indium ion can form precipitates with hydroxyl ion;
S4 —filtering off the precipitates formed in step S3; and
S5 —evaporating the solution obtained in step S4 to obtain crystals of indium salt. The method improves the reusing rate of the defective panels, is helpful to environment protection, and saves resources.

14 Claims, 2 Drawing Sheets

(51) Int. Cl.
*C22B 58/00* (2006.01)
*C01G 15/00* (2006.01)

(56) References Cited

FOREIGN PATENT DOCUMENTS

| JP | 2002069544 A | * | 3/2002 |
| JP | 2007270262 A | * | 10/2007 |

OTHER PUBLICATIONS

Ploessl, Robert. "Indium Salts." Indium Corporation. N.P. 1996.*
Nagata, Hideki et al. JP 2000-169991 A published Jun. 2000. Machine translation.*
Takemoto, Koichi et al. JP 2002-069544 A published Mar. 2002. Machine translation.*
Abumiya, Mitsuo. JP 2007-270262 A published Oct. 2007. Machine translation.*
Zhou, Quanfa et al. CN 10463046 A published May 2015. Machine translation.*

* cited by examiner

METHOD FOR RECYCLING INDIUM

TECHNICAL FIELD

The present invention relates to the technical field of waste panel treatment, particularly to a method for recycling indium from a panel.

BACKGROUND

At present, touch panel, as the latest computer input device, is the most simple, convenient and natural mode of human-computer interaction. With the increasing use of computers, touch panel has been more and more widely used for its advantages such as easy-to-use, firmness, durability, fast response and space-saving and the like.

Particularly, OGS touch panel, which is light and thin and has high light transmittance and excellent display effect, is a medium- and high-end product in accordance with the development tendency of touch panels. However, the pass yield thereof is difficult to control for its complicate fabrication process. Particularly, the singleton defect rate reaches about 5%, while the defect rate after bonding even reaches up to 10% to 20%. A large amount of scrapped touch panel products resulted by such high defect rates have constructed a main part of electrical and electronic wastes. OGS touch panel contains high-strength glass, indium tin oxide, and other metals and polymer materials, which are seldom recycled effectively currently, thus causing not only resources waste but also environment pollution. Especially, the rare metal of indium contained in the indium tin oxide, which has a very small content and distributes discretely in the earth crust, and is high in price, plays an irreplaceable role in the display field and other electronic information industry, therefore it is very valuable to recycle the metal indium.

CN 102629173A discloses a method for recycling an ITO conductive film from a capacitive touch screen, comprising the following steps: a. freezing: freezing the defective capacitive touch screen in a freezer at −90 to −70° C. for 25 to 35 min; and b. disassembling: disassembling the frozen capacitive touch screen and recycling the conductive film bonded on the composite glass screen. During the disassembling and recycling of the capacitive touch screen, the adhesion of the double-sided adhesive between the composite glass screen and the ITO conductive film is weakened after freezing, so the ITO conductive film can be effectively disassembled down from the composite glass screen and then be recycled, thus saving resources.

The above recycling method is suitable for the capacitive touch screen having a GF structure. However, as for OGS touch screen, the ITO pattern layer used as a touch electrode is directly formed on the glass and there is no separate ITO conductive film, therefore such method cannot be used for the disassembling and recycling of the OGS touch screen.

Thus, how to recycle indium from various kinds of panels is a problem urgently to be solved in the art.

SUMMARY

An object of the present invention is to provide a method for recycling indium from a panel, which is suitable for recycling indium from various kinds of panels.

To achieve the above object, the present invention provides a method for recycling indium from a panel on which an electrode layer made of indium tin oxide is formed, the method comprising:

S1—removing each of pattern layers on the panel to obtain particles formed by the pattern layers;

S2—adding an acid solution to the particles so as to dissolve the substances which can be dissolved in the acid solution, and then filtering to give a solution containing indium ion;

S3—adding an alkaline solution to the solution obtained in step S2, so that metal ions other than indium ion can form precipitates with hydroxyl ion;

S4—filtering off the precipitates formed in step S3; and

S5—evaporating the solution obtained in step S4 to obtain crystals of indium salt.

Preferably, the method further comprises:

S6—reducing the indium salt to obtain metal indium.

Preferably, in step S3, the alkaline solution is aqueous ammonia.

Preferably, the acid solution in step S2 is a hydrochloric acid solution, and the indium salt obtained in step S5 is indium chloride.

Preferably, step S5 comprises:

S5-1: evaporating the solution obtained in step S4 to give crystals comprising ammonium chloride and indium chloride; and S5-2: heating the obtained crystals so that ammonium chloride in the crystals decomposes into hydrogen chloride and ammonia gas, thereby separating indium chloride from ammonium chloride.

Preferably, the heating temperature in step S5-2 is 250° C. to 350° C.

Preferably, step S5 further comprises:

S5-3: introducing hydrogen chloride and ammonia gas obtained in step S5-2 into a cooling chamber so that hydrogen chloride and ammonia gas can re-crystallize into ammonium chloride.

Preferably, the alkaline solution used in step S3 can be prepared by ammonium chloride obtained in step S5-3.

Preferably, in step S1, a mixture of water and particles formed by said pattern layers can be obtained by polishing the panel while washing the panel with water, and in step S2, the acid solution is added into the mixture of water and particles formed by said pattern layers.

Preferably, the panel is an OGS panel.

In the method of the present invention, each pattern layer on the panel is firstly crushed into particles. Due to the small size of the particles, the specific surface area thereof is relatively increased, and the metals and metal oxides in the particles are readily to react sufficiently with the acid so as to form metal salts solution.

The method for recycling indium in the present invention is not only suitable for all types of panels, but also applicable to recycle other usable materials in the panel as well as indium, which can improve the reusing rate of the defective panels, is helpful to environment protection, and can save resources.

BRIEF DESCRIPTION OF THE DRAWINGS

The present invention will be more clearly understood from the attached drawings which are a part of the Description and intended to explain the present invention in conjunction with the following specific embodiments, but not to limit the present invention. In these drawings.

DETAILED DESCRIPTION OF CERTAIN EMBODIMENTS

Hereinafter, specific embodiments of the present invention will be described in detail with reference to the attached drawings. It should be understood that the specific embodiments described herein are only intended to illustrate and explain the present invention, but not to limit the present invention.

Figure 1:
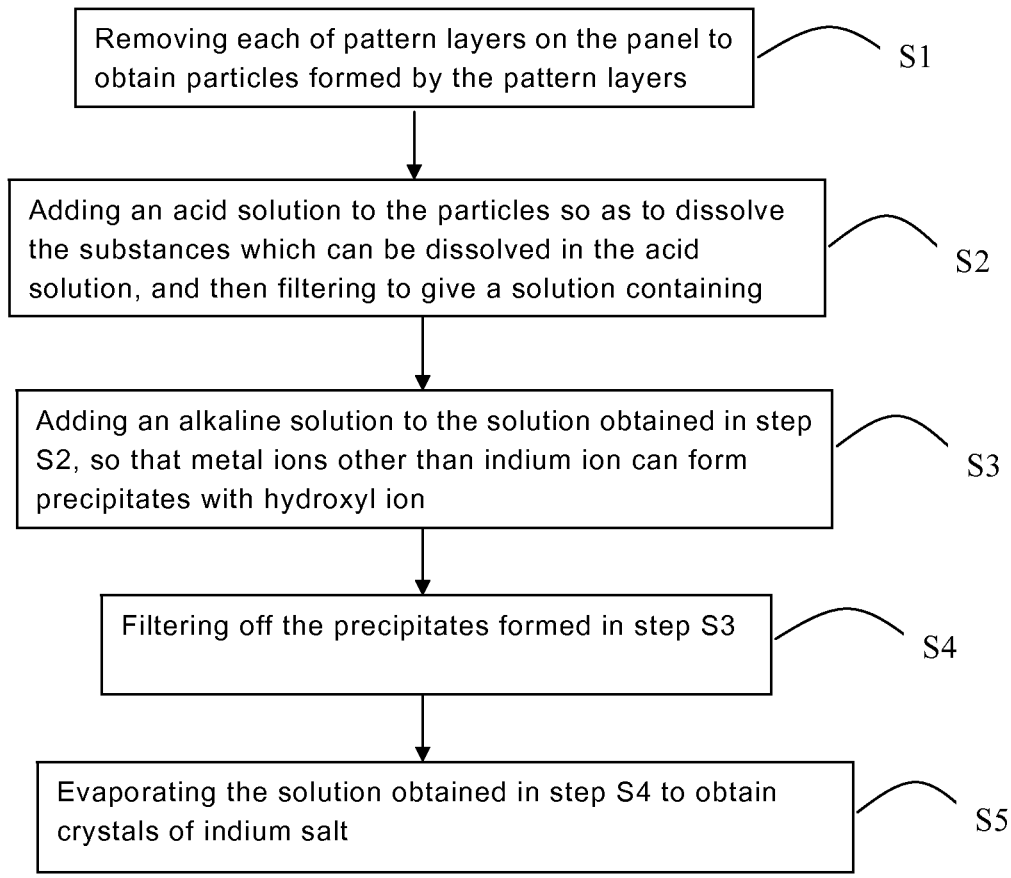
FIG. 1 is a schematic flowchart of the method for recycling indium from a panel according to the present invention.

As shown in FIG. 1, the present invention provides a method for recycling indium from a panel on which an electrode layer made of indium tin oxide (ITO) is formed, the method comprising:

S1—removing each of pattern layers on the panel to obtain particles formed by the pattern layers;

S2—adding an acid solution to the particles so as to dissolve the substances which can be dissolved in the acid solution, and then filtering to give a solution containing indium ion;

S3—adding an alkaline solution to the solution obtained in step S2, so that metal ions other than indium ion can form precipitates with hydroxyl ion;

S4—filtering off the precipitates formed in step S3; and

S5—evaporating the indium ion containing solution obtained in step S4 to obtain crystals of indium salt.

It should be noted that the panel may be a display panel or a touch panel, and therefore, in addition to the electrode layer, the pattern layers in step S1 may also include a metal pattern layer or a non-metal layer (e.g., a gate insulating layer, a passivation layer, etc.).

In the method of the present invention, each pattern layer on the panel is firstly crushed into particles. Due to the small size of the particles, the specific surface area thereof is relatively increased, and the metals and metal oxides in the particles are readily to react sufficiently with the acid so as to form metal salts solution. The metal salts solution obtained in step S2 includes not only indium ion, but also ions of other metals. For example, the solution obtained in step S2 further includes aluminum ion when the panel has a gate-line layer and a data-line layer formed by aluminum.

Typically, the amount of metals used to form the metal pattern layers is larger than that of indium in the electrode layer, and therefore, in step S3, the hydroxyl ion in the alkaline solution firstly combines with the large amount of the metal ions rather than indium ion so as to form alkali of the metals which is generally insoluble in water. In step S3, the amount of the alkaline solution should be controlled carefully, so that indium ion would not combine with hydroxyl ion to form precipitate.

The alkali of metals obtained in step S3 may also be reused. For example, when the metal alkali is aluminum hydroxide, the aluminum hydroxide obtained in step S3 may be used in the production of aluminum.

Crystals of indium salt can be obtained after the step S5. Some of the indium salt crystals can be directly used, for example, when the indium salt is indium chloride, it can be used in the medical field.

In addition, the indium salt can be reduced into metal indium, which can be used in industrial production.

In such case, the method further comprises:

S6—reducing the indium salt to obtain metal indium.

How to reduce indium salt to metal indium is well known in the art and need not to be repeated here.

In step S3, the alkaline solution is aqueous ammonia. Although aqueous ammonia can generate hydroxyl radical via ionization, the indium hydroxide precipitate would not be easily formed in the step S3 because aqueous ammonia is a weak base which cannot conduct completely ionization in water. Further, the obtained ammonium salts can be easily removed, and thus preventing too many impurities to be contained in the indium salt obtained in step S5.

As described above, indium chloride can be directly used in the medical field, and therefore, the acid solution used in the step S2 is preferably hydrochloric acid solution, so that the indium salt obtained in the step S5 is indium chloride.

Ammonium chloride will be generated when the alkaline solution used in step S3 is aqueous ammonia, and therefore ammonium chloride can also be obtained in step S5 in addition to the indium salt crystals. In such case, the step S5 comprises:

S5-1: evaporating the solution obtained in step S4 to give crystals comprising ammonium chloride and indium chloride; and S5-2: heating the obtained crystals so that ammonium chloride in the crystals decomposes into hydrogen chloride and ammonia gas, thereby separating indium chloride from ammonium chloride.

In a preferred embodiment of the present invention, the heating temperature in step S5-2 is 250° C. to 350° C. More preferably, the heating temperature in step S5-2 is 300° C.

In order to make full use of resources, step S5 preferably further comprises:

S5-3: introducing hydrogen chloride and ammonia gas obtained in step S5-2 into a cooling chamber so that hydrogen chloride and ammonia gas can re-crystallize into ammonium chloride.

Ammonium chloride obtained in step S5-3 can be directly used in agricultural production or reused in the method of the present invention. That is to say, the alkaline solution used in step S3 can be preferably prepared by ammonium chloride obtained in step S5-3. In this case, the step S5-2 can be performed in a closed furnace to prevent the escape of ammonia gas and hydrogen chloride gas. In step S5-3, the hydrogen chloride gas and ammonia gas can be introduced into a cooling chamber by an exhaust fan.

To make each pattern layer on the panel into particles, preferably, in step S1, a mixture of water and particles formed by said pattern layers can be obtained by polishing the panel while washing the panel with water, and in step S2, the acid solution is added into the mixture of water and particles formed by said pattern layers.

A panel without pattern layers can be obtained after step S1 and it can be used in the fabrication of a display panel after surface treatment, which can further improve the utilization of the raw materials.

As described above, the method may be applied to the treatment of a display panel or an OGS panel (i.e., the panel is an OGS panel).

Figure 2A:
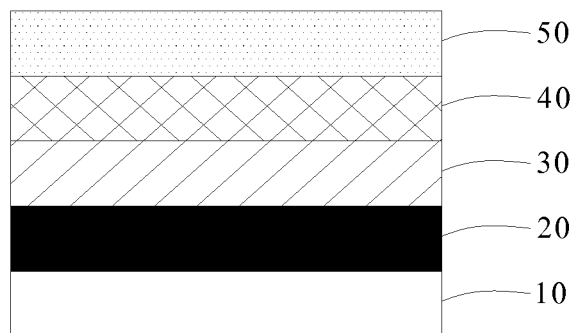
FIGS. 2 (a) to 2 (c) are the structure charts of three different panels.
Figure 2B:
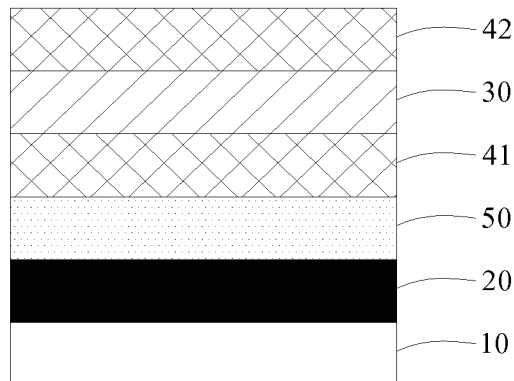
Figure 2C:

FIGS. 2 (a) to 2 (c) show the OGS panels which are applicable to the method according to the present invention. In FIG. 2 (a), a black matrix 20, a metal pattern layer 30, a transparent adhesive layer 40 and a transparent electrode layer 50 are sequentially disposed on a transparent substrate 10. In FIG. 2 (b), a black matrix 20, a transparent electrode layer 50, a first transparent adhesive layer 41, a metal pattern layer 30, and a second transparent adhesive layer 42 are sequentially disposed on a transparent substrate 10. In FIG. 2 (c), a black matrix 20, a first transparent electrode layer 51, a first transparent adhesive layer 41, a second transparent electrode layer 52, a metal pattern layer 30, and a second transparent adhesive layer 42 are sequentially disposed on a transparent substrate 10.

EXAMPLES

Unless otherwise specified, the touch screens used in the following examples were available from BOE Technology Group Co., Ltd.; and the reagents used therein were purchased from Beijing Chemical Reagent Works.

Example 1

10 pcs of 11.6 inch OGS touch screen to be recycled were adsorbed on a worktable by vacuum, and the inner surfaces of the touch screens were polished by a glass engraving machine with a vertical feed rate of 50 μm so as to peel off each layer thereon. The obtained debris was taken away by running water, and then was filtered to obtain precipitate which weighs 68.36 g after drying. The precipitate was added into 20% (V/V) aqueous hydrochloric acid solution to result a solution of 1 L. The precipitate was soaked in the solution at 40° C. for 2 hours, and then the undissolved impurities were filtered off to obtain metal ions solution containing indium ion and other metal ions (mainly aluminum ion). 1 L of 25% (V/V) aqueous ammonia was added into the metal ions solution, so as to neutralize hydrochloric acid and generate aluminum hydroxide precipitate and the like. After the reaction was completed, the precipitates were filtered off to give a filtrate containing indium which is subsequently evaporated to obtain crystals. The obtained crystals were fed into a closed furnace and heated to 300° C., wherein ammonium chloride decomposed into HCl gas and $NH_3$ gas which were pumped to a cooling chamber by an exhaust fan so as to re-form ammonium chloride crystal. 0.29 g of indium chloride crystal was recycled from the closed furnace after ammonium chloride crystal decomposed sufficiently.

Example 2

10 pcs of 15.6 inch OGS touch screen to be recycled were adsorbed on a worktable by vacuum, and the inner surfaces of the touch screen were polished by a glass engraving machine with a vertical feed rate of 50 μm so as to peel off each layer thereon. The obtained debris was taken away by running water, and then was filtered to obtain precipitate which weighs 113.82 g after drying. The precipitate was added into 20% (V/V) aqueous hydrochloric acid solution to result a solution of 1.5 L. The precipitate was soaked in the solution at 40° C. for 2 hours, and then the undissolved impurities were filtered off to obtain metal ions solution containing indium ion and other metal ions (mainly aluminum ion). 1.5 L of 25% (V/V) aqueous ammonia was added into the metal ions solution, so as to neutralize hydrochloric acid and generate aluminum hydroxide precipitate and the like. After the reaction was completed, the precipitates were filtered off to give a filtrate containing indium which is subsequently evaporated to obtain crystals. The obtained crystals were fed into a closed furnace and heated to 300° C., wherein ammonium chloride decomposed into HCl gas and $NH_3$ gas which were pumped to a cooling chamber by an exhaust fan so as to re-form ammonium chloride crystal. 0.51 g of indium chloride crystal was recycled from the closed furnace after ammonium chloride crystal decomposed sufficiently.

It can be seen from the above description that, the method for recycling indium according to the present invention is not only suitable for all types of panels, but also applicable to recycle other usable materials in the panel as well as indium, which can improve the reusing rate of the defective panels, is helpful to environment protection, and can save resources.

It can be understood that, the foregoing description of the embodiments has been provided for the purposes of illustrating the principles of the present invention; however the present invention is not limited to this. Obviously, many modifications and variations will be apparent to a person skilled in the art without departing from the spirit and essence of the present invention, and these modifications and variations also fall into the scope of the invention.

The invention claimed is:

1. A method for recycling indium from a panel on which an electrode layer made of indium tin oxide (ITO) is formed, comprising:
    S1—removing each of pattern layers on the panel to obtain particles formed by the pattern layers;
    S2—adding an acid solution to the particles so as to dissolve the substances which can be dissolved in the acid solution, and then filtering to give a solution containing indium ion;
    S3—adding an alkaline solution to the solution obtained in step S2, so that metal ions other than indium ion can form precipitates with hydroxyl ion;
    S4—filtering off the precipitates formed in step S3; and
    S5—evaporating the solution obtained in step S4 to obtain crystals of indium salt;
wherein
    the alkaline solution in step S3 is aqueous ammonia, and the acid solution in step S2 is a hydrochloric acid solution and the indium salt obtained in step S5 is indium chloride.

2. The method according to claim 1, wherein it further comprises:
    S6—reducing the indium salt to obtain metal indium.

3. The method according to claim 2, wherein, in step S1, a mixture of water and particles formed by said pattern layers is obtained by polishing the panel while washing the panel with water; and in step S2, and the acid solution is added into the mixture of water and particles formed by said pattern layers.

4. The method according to claim 2, wherein the panel is a touch screen panel.

5. The method according to claim 1, wherein step S5 comprises:
    S5-1: evaporating the solution obtained in step S4 to give crystals comprising ammonium chloride and indium chloride; and
    S5-2: heating the obtained crystals so that ammonium chloride in the crystals decomposes into hydrogen chloride and ammonia gas, thereby separating indium chloride from ammonium chloride.

6. The method according to claim 5, wherein the heating temperature in step S5-2 is 250-350° C.

7. The method according to claim 6, wherein, in step S1, a mixture of water and particles formed by said pattern layers is obtained by polishing the panel while washing the panel with water; and in step S2, and the acid solution is added into the mixture of water and particles formed by said pattern layers.

8. The method according to claim 6, wherein the panel is a touch screen panel.

9. The method according to claim 5, wherein step S5 further comprises:
   S5-3: introducing hydrogen chloride and ammonia gas obtained in step S5-2 into a cooling chamber so that hydrogen chloride and ammonia gas can re-crystallize into ammonium chloride.

10. The method according to claim 9, wherein the alkaline solution used in step S3 is prepared from the ammonium chloride obtained in step S5-3.

11. The method according to claim 5, wherein, in step S1, a mixture of water and particles formed by said pattern layers is obtained by polishing the panel while washing the panel with water; and in step S2, and the acid solution is added into the mixture of water and particles formed by said pattern layers.

12. The method according to claim 5, wherein the panel is a touch screen panel.

13. The method according to claim 1, wherein, in step S1, a mixture of water and particles formed by said pattern layers is obtained by polishing the panel while washing the panel with water; and in step S2, and the acid solution is added into the mixture of water and particles formed by said pattern layers.

14. The method according to claim 1, wherein the panel is a touch screen panel.

* * * * *